United States Patent [19]
Gilbert

[11] 3,845,677
[45] Nov. 5, 1974

[54] MULTI-SPINDLE AUTOMATIC LATHES

[76] Inventor: Harold James Gilbert, 121 Lavender Ave., Coventry, England

[22] Filed: Aug. 5, 1970

[21] Appl. No.: 61,171

[52] U.S. Cl. .................... 82/29 R, 82/3, 29/38 B
[51] Int. Cl. ............................................. B23b 19/02
[58] Field of Search ..................... 82/3, 29; 29/38 B

[56]             References Cited
                UNITED STATES PATENTS
2,825,121   3/1958   Williams ............................. 82/3 X
3,063,131   11/1962  Fenn ........................................ 82/3
3,404,583   10/1968  Jacoby ................................. 82/3 X Primary Examiner—Leonidas Vlachos
Attorney, Agent, or Firm—Holman & Stern

[57]           ABSTRACT

A multi-spindle automatic lathe comprising a housing, a driving shaft, a spindle drum which is indexable in said housing and which has a plurality of work spindles and a plurality of layshafts, and gearing interconnecting said driving shaft, layshafts and work spindles to provide at least two alternative work spindle speeds in the same direction of rotation for any given driving shaft speed. The axes of said layshafts are radially offset with respect to the axis of said driving shaft and a plurality of clutches are mounted on each work spindle for drivingly connecting said driving shaft to the work spindle to effect rotation of the latter at any one of the alternative work spindle speeds.

3 Claims, 2 Drawing Figures

PATENTED NOV 5 1974　　　　　　　　　3,845,677

SHEET 1 OF 2

INVENTOR
Harold James Gilbert
Holman & Stern
ATTORNEYS

MULTI-SPINDLE AUTOMATIC LATHES

This invention relates to multi-spindle automatic lathes and has as its object the provision of such a lathe having improved means for varying the speeds of the work spindles.

In accordance with the invention, there is provided a multi-spindle automatic lathe which comprises a housing, a driving shaft, a spindle drum indexable in the housing, a plurality of work spindles carried by the spindle drum, and a plurality of layshafts, the axes of the layshafts being radially off-set with respect to the axis of the driving shaft, first and second gears mounted on each work spindle for rotation relative thereto, first and second gears mounted on each layshaft for rotation therewith, the first and second layshaft gears meshing with the first and second work spindle gears, a single driving gear carried by the driving shaft meshing with the first gears of the work spindle, and clutch means mounted on each work spindle for selective engagement with said first and second gears on the work spindle for drivingly connecting the driving shaft to the work spindle for effecting rotation of the work spindle at one of the alternative work spindle speeds regardless of the speed of the other work spindles.

Conveniently, there is an even number of work spindles and one layshaft for each pair of work spindles.

Figure 1:
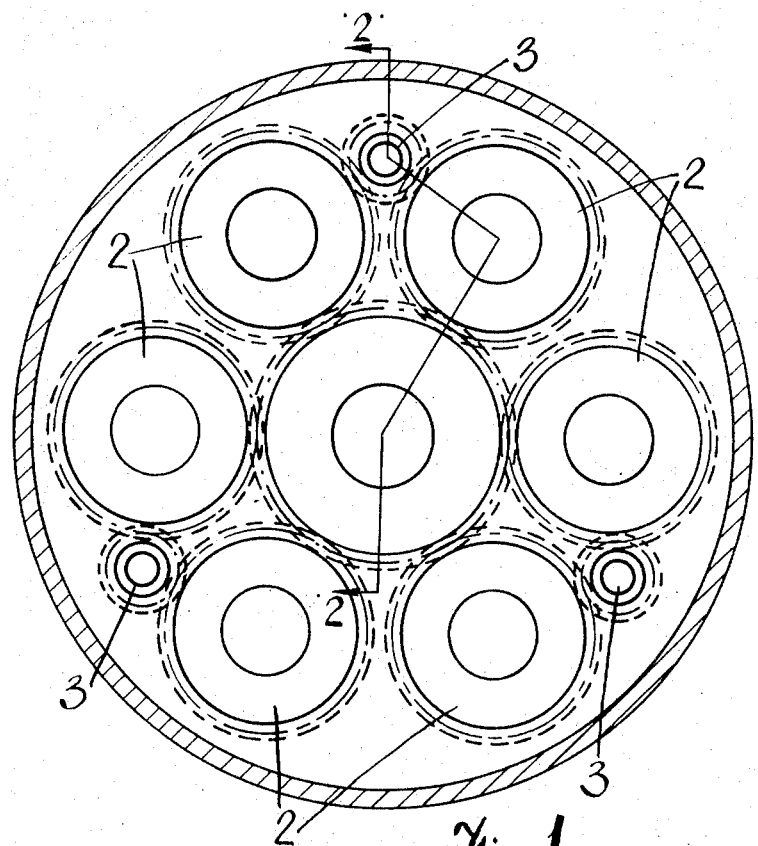
Figure 2:
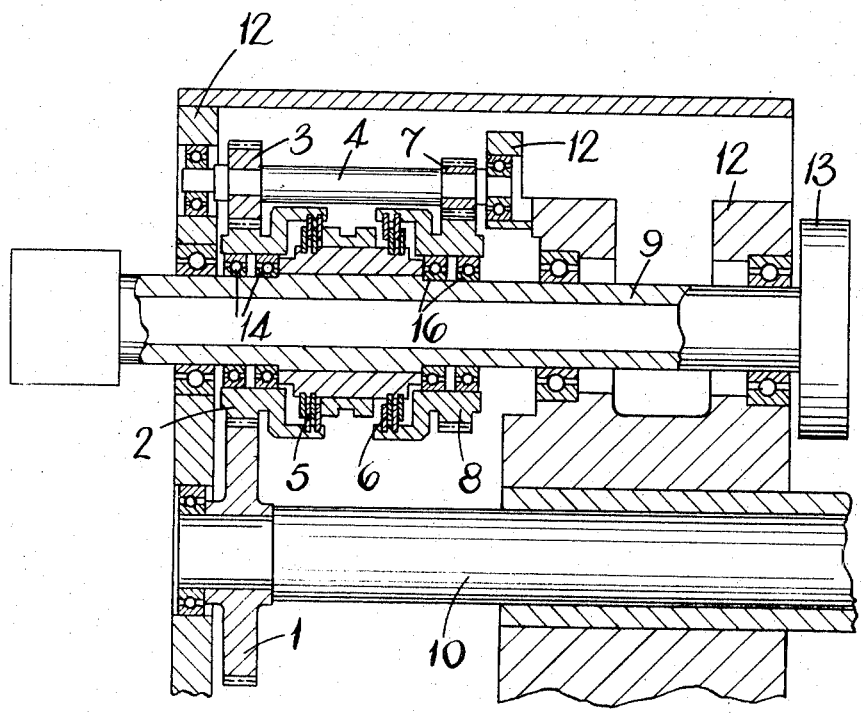

One example of a multi-spindle automatic lathe constructed in accordance with the present invention is illustrated in the accompanying drawings wherein FIG. 1 is a schematic end view of gearing forming part of the driving means for the spindles and FIG. 2 is a sectional view on the line 2—2 of FIG. 1 of the lathe.

The lathe shown in the drawings has a spindle drum 12 which is mounted in a housing (not shown) and arranged so as to be indexable in said housing. The spindle drum carries a plurality (for example six) work spindles 9 and a workpiece chuck 13 is mounted at one end of each spindle 9.

There is also provided a driving shaft 10 which is drivable in any convenient manner and which is parallel to the work spindles 9, the latter being equi-angularly spaced around the shaft 10. There is also provided a plurality of layshafts 4 and in the example now described there is an even number of work spindles and a layshaft for each pair of such spindles.

As will be seen from the drawings the axes of the layshafts 4 are radially offset with respect to the axis of said driving shaft 10. At one end of the driving shaft 10 is mountd a main driving gear 1 which is rotatable with the shaft 10 and said gear engages with a plurality of further gears 2 which are respectively mounted on the work spindles 9 so that each gear 2 can rotate relative to the associated work spindle on bearings 14. Each of said gears 2 is however connected to one part of a friction clutch 5, the other part of which is connected to the associated work spindle 9 so that engagement of the clutch 5 will result in the gear 2 rotating with the spindle 9.

At one end of each layshaft 4 is another gear 3 which meshes with a gear 2 on each of two work spindles 9, each layshaft being carried in bearings in the spindle drum so as to be freely rotatable in said drum. The opposite end of each layshaft is provided with a gear 7 which meshes with a gear 8 mounted on a work spindle 9 through the intermediary of bearings 16. The two gears 3 and 7 on each layshaft are secured to the layshaft so as to rotate therewith. Furthermore each work spindle has a further friction clutch 6, one part of the clutch 6 being rotatable with the work spindle 9 and the other part being connected to the gear 8 so that engagement of the clutch 6 will result in the gear 8 and work spindle 9 rotating together.

The above-described arrangement provides two possible alternative speeds for each work spindle, said alternative speeds being in the same direction of rotation. Any convenient means are provided for selectively engaging either the clutch 5 or the clutch 6 on any desired work spindle or spindles and at any desired station so that if clutch 5 on the work spindle 9 as seen in FIG. 2 is engaged then the driving shaft 10 will impart a drive to said spindle through gear 1 and gear 2. In this situation the associated layshaft 4 will also be driven through gear 3 but owing to the fact that the clutch 6 will be disengaged the gear 8 will rotate relatively to the work spindle 9. On the other hand if clutch 5 is disengaged and clutch 6 engaged a drive will be imparted to the work spindle 9 from the driving shaft 10 through gear 1, gear 2 and thence through the layshaft gears 3 and 7 to gear 8, thus driving the spindle 9 at a different speed from that applying when the clutch 5 is engaged and clutch 6 disengaged.

As above-described two alternative gear trains are provided for each work spindle but it is of course to be understood that more than two alternative gear trains can be utilised if desired, each work spindle then having an appropriate number of clutches which are arranged so that any one of the clutches can be engaged whilst the other clutches are disengaged to provide any selected work spindle speed. The use of layshaft however as above-described provides a relatively simple and inexpensive construction in which alternative work spindle speeds can be obtained. Furthermore in the above-described embodiment the gear 1 has been described in a manner in which it co-acts with the gear 2 however as in an alternative embodiment the gear 1 may co-act with the gear 8, thus making for a shorter main driving shaft.

Having thus described my invention what I claim as new and desire to secure by Letters Patent is:

1. A multi-spindle automatic lathe comprising a housing, a driving shaft, a spindle drum indexable in said housing, a plurality of work spindles carried by the spindle drum, and a plurality of layshafts, the axes of said layshafts being radially offset with respect to the axis of said driving shaft, first and second gears mounted on each work spindle for rotation relative thereto, first and second gears mounted on each layshaft for rotation therewith, said first and second layshaft gears meshing with said first and second work spindle gears, a single driving gear carried by the driving shaft meshing with said first gears of the work spindle, and clutch means mounted on each work spindle for selective engagement with said first and second gears on the work spindle for drivingly connecting said driving shaft to the work spindle to effect rotation of the work spindle at one of the alternative work spindle speeds irrespective of the speed of the other work spindles.

2. The multi-spindle automatic lathe as claimed in claim 1 wherein there is provided an even number of said work spindles.

3. The multi-spindle automatic lathe as claimed in claim 2 wherein there is provided one layshaft for each pair of work spindles.

* * * * *